United States Patent [19]
Jensen et al.

[11] 4,229,792
[45] Oct. 21, 1980

[54] BUS ALLOCATION SYNCHRONIZATION SYSTEM

[75] Inventors: Earl D. Jensen, Bloomington; George D. Marshall, North St. Paul, both of Minn.

[73] Assignee: Honeywell Inc., Minneapolis, Minn.

[21] Appl. No.: 28,147

[22] Filed: Apr. 9, 1979

[51] Int. Cl.³ .................... G06F 15/16; G06F 11/00
[52] U.S. Cl. .................................. 364/200; 371/47; 371/61; 370/85
[58] Field of Search ... 364/200 MS File, 900 MS File; 371/7, 47, 61; 370/85, 86, 89, 91

[56] References Cited
U.S. PATENT DOCUMENTS

| | | | |
|---|---|---|---|
| 3,573,856 | 4/1971 | Best | 364/200 |
| 3,753,228 | 8/1973 | Nickolas et al. | 371/47 |
| 3,866,184 | 12/1975 | Buhrke et al. | 364/200 |
| 3,867,579 | 2/1975 | Colton et al. | 364/900 |
| 3,919,483 | 11/1975 | Gindi et al. | 370/85 |
| 3,924,240 | 12/1975 | Given | 370/85 |
| 3,989,894 | 11/1976 | Charransol et al. | 364/900 |
| 4,017,841 | 4/1977 | Jensen et al. | 364/900 |
| 4,050,097 | 9/1977 | Miu et al. | 364/200 |
| 4,071,887 | 1/1978 | Daly et al. | 364/900 |
| 4,130,865 | 12/1978 | Heart et al. | 364/200 |

*Primary Examiner*—Mark E. Nusbaum
*Attorney, Agent, or Firm*—Charles G. Mersereau

[57] ABSTRACT

An improved bus allocation system to control a time division multiplexed digital data bus used by a plurality of signal sources such as a number of digital processing components in a decentralized system in which there is no single entity controlling the bus. The system includes a mechanism for maintaining allocation synchronization under realistic, non-ideal conditions in which noise or other error producing interferences may be present. Each signal source is provided with a bus interface unit having an address counter which operates in conjunction with an allocation vector. The counters operate through a repeating cycle of counts and one or more of the counts in each cycle based on its allocation vector. Each address counter is synchronized during or following the receipt of a message using a unique comparison sequence of comparisons. By means of this system the value of all counters within the range of synchronization are made identical in response to a bus allocation synchronization signal. If a given address counter is off too many counts to be synchronized, the transmitter of the associated device is disabled until it can be re-synchronized by a later synchronization signal. Thus any device having a counter that is out of synchronization for any reason cannot transmit until such synchronization is restored. This prevents interference occasioned by more than one device using the bus at a given time.

5 Claims, 8 Drawing Figures

BUS ALLOCATION SYNCHRONIZATION SYSTEM

The invention herein described was made in the course of or under a contract, or subcontract thereunder, with the Department of the Navy.

BACKGROUND OF THE INVENTION

1. Field Of The Invention

This invention relates generally to digital processing systems and, more particularly, to a system where there are multiple computers or other devices which communicate among each other over one or more shared data buses. The present invention relates to prevention of allocation errors by an improved mechanism for synchronizing the use of the bus by a multiplicity of such devices.

2. Description Of The Prior Art

In a system in which a plurality of devices are connected such that they may communicate over one or more data buses, there must be some system which determines the priority of use of any given bus by each of the devices. The data to be communicated in such a system may include a code identifying the device as to which data is to be communicated such that when the bus communicates a particular code, particular device is actuated to accept or transmit data and the remaining devices are disabled during the time that particular device is transmitting along the bus. Such an arrangement is economical of intercommunication wiring, however, it does impose the condition that one and only one device may be allowed to communicate data to the bus at any one given instant in time. The procedure for insuring that this condition is met is called bus allocation for time division multiplexing. The devices then communicate by sharing the bus using some sort of time division multiplexing scheme.

The type of system utilizing communication buses in conjunction with a plurality of devices is useful in a wide variety of applications including real-time systems which is industrial process control and military weapons and guidance systems. These systems generally have several computers and interface devices which must pass control information and data back and forth among each other. Thus, they are interconnected with one or more buses via units called bus interface units (BIU's).

It is customary in designing bus allocation systems to base the design on some demand principle. When a particular device completes its use of the bus, some centralized or distributed apparatus having received signals indicating that various other devices all have data to be communicated to the bus, proceeds according to some demand principle to assign the bus to a particular one of the devices. A typical instance is one in which the various devices are assigned priorities, and the use of the bus is given to them in the order of priority. This is an intricate arrangement and must be made even more intricate if it is desired to assure that the device with the highest priority may not monopolize the bus to prevent lower priority devices from ever using it. In addition, arrangements of this sort are extremely expensive, difficult to design in a fool-proof manner and difficult to simulate and verify. All these factors contribute materially to an ultimate high cost and reduced reliability.

One prior art solution to this dilemma is contained in a patent to Jensen, U.S. Pat. No. 4,017,841, a co-inventor in the present application, and which is assigned to the same assignee as the present application. That invention assigns use of a data bus to the various devices according to a predetermined schedule on a count basis. Each device is connected to the data bus through a bus interface unit (BIU). Each bus interface unit contains a synchronized counter called an address counter and an allocation vector or control schedule memory. The allocation vector has an address pointer which increments through a repeating cycle of counts, each of which is the address of a location in the corresponding allocation vector. The bits and the allocation vectors are set so that for any allocation vector address there is only one bus interface unit which has a logic "one" in the word at that address in its allocation vector memory. Therefore, all allocation vectors in the system are unique. Thus a first device may be enabled once during each counter cycle while a second device may be enabled three times during the cycle and the third device may be enabled twice, all according to the coordinated pre-assigned allocation vector memory distribution.

The mechanism is activated when some unit on the bus sends an allocation synchronization signal. On receipt of that signal all bus interface units increment their address counters, or reset them if the limit of the counter is reached. The selected bit in the allocation vector is examined by each bus interface unit. The bus interface unit which finds a logic "one" can transmit on the bus. All other bus interface units will find a logic "zero" and will therefore not transmit at this time. When the transmitting bus interface unit completes its transmission, which may be a null transmission, it will then send a new allocation synchronization signal and the above procedure will repeat.

While the above system has been successfully used, it is vulnerable to certain types of errors which could occur on the bus or in a bus interface unit. The above scheme depends on maintaining the same value in all address counters and if that value in one bus interface unit ever differs from the counter values in any of the other units, two or more bus interface units could transmit on the bus simultaneously. This phenomenon is known as a "collision" and results in invalid signals which could cause performance degradation or total failure of the bus system. Practical experience has indeed shown this to be a problem. Thus, there has been a need for a bus allocation control mechanism which would successfully synchronize the counts in each of the address counters.

SUMMARY OF THE INVENTION

By means of the present invention the problems associated with loss of synchronization by a plurality of address counters in a time division multiplexed digital data bus system has been solved by the provision of a unique bus allocation synchronization mechanism which successfully operates under realistic, non-ideal conditions in which noise and other error producing interferences may cause counters to lose synchronization. Each bus interface unit is provided with an address counter which operates in conjunction with an allocation vector through its allocation vector pointer. The allocated bus periods are called time slots. Each address counter is synchronized during or following the receipt of a message during each time slot using a unique comparison system. By means of this system, the value of each counter is either made identical to all other counters in response to a bus allocation synchronization signal or its corresponding transmitter disabled until such can be achieved by a later synchronization signal. Thus, any counter that is out of synchronization for any reason cannot cause a transmission until synchronization is restored. This prevents collisions which occur when more than one unit transmits on the bus at any given time.

A synchronization signal is sent as a part of each message that goes out on the bus. That signal, called the source time slot, equals the value of the sender's allocation vector address counter, called its current time slot. Each bus interface unit stores the value of its current time slot, and also the value of the old source time slot which is the value derived from the last source time slot value incremented by one for each reallocation signal which was received by the bus interface unit.

When each bus interface unit receives the source time slot synchronization signal, it makes several comparisons to determine the validity of the value of the signal. If the source time slot is equal to the current time slot, then the particular bus interface unit address counter is at the proper value and operating normally such that no correction is required. If a bus interface unit finds that an incoming source time slot does not equal the current time slot then the source time slot is compared to that current time slot plus one. If they are equal, the receiving bus interface unit is one time slot behind the transmitting bus interface and it is assumed that the receiving bus interface unit has missed some previous reallocation signal. Correction is made by setting the current time slot value in this bus interface unit to the source time slot value. If this comparison also fails, then the source time slot is compared to the old source time slot. If these values match then the source time slot is consistent with the last source time slot value received by the bus interface unit in some previous message. The value of the current time slot in the receiving bus interface unit is therefore assumed to be in error and the current time slot is again forced to equal the source time slot to make the correction.

If all of these comparisons fail, the bus interface unit's transmitter is disabled so that it cannot transmit until it regains synchronization. The value of the receiving current source time slot is also copied into the old source time slot register of the disabled bus interface unit. This value is also incremented by each reallocation signal subsequently received. Therefore, the next time a message is transmitted and a source time slot is received, that source time slot should match the old source time slot in the disabled bus interface unit. If it does, synchronization of that bus interface unit is thereby reestablished, thus re-enabling the transmitter.

At the end of each message, a reallocation command which is also known as an End of Transaction (EOT) signal is transmitted causing all allocation vector pointers to be incremented by one position in the control schedule memory or reset to zero if the limit of the control schedule memory has been reached. This reallocates the bus priority according to the next control schedule memory time slot position.

BRIEF DESCRIPTION OF THE DRAWINGS

In the drawings wherein like numerals are utilized to designate like parts throughout the same.

DESCRIPTION OF THE PREFERRED EMBODIMENT

Figure 1:
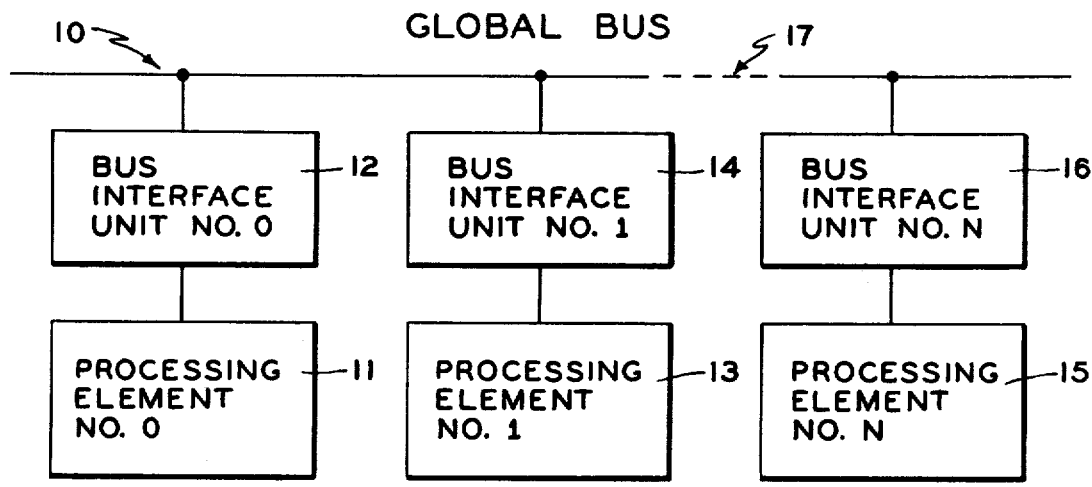
FIG. 1 is a block diagram of a system wherein the invention may be utilized.

The bus allocation system or mechanism of the present invention, as discussed above, is used in systems such as the one illustrated in FIG. 1. Thus, there is shown in FIG. 1 at 10 a typical global bus in accordance with the multiple use concept. Associated therewith are a first processing element 11 with associated bus interface unit 12, a second processing element 13 with associated bus interface unit 14 and an nth processing element designated 15 and its corresponding bus interface unit 16. The global bus line 10 is broken as at 17 to denote that a number of additional processing elements may also share the global bus. Each processing element may be a digital computer, tape reader, register, or other interfacing device. Communication among the devices or processing elements is achieved over the bus 10 by means of each corresponding bus interface unit. Therefore, there is one bus interface unit per processing element. In order for the computers or bus interface units to communicate among themselves utilizing the global bus, there must be some system devised such that the use of the bus may be time shared. Not only must the bus be properly time shared, it must be done utilizing a method whereby all the processing elements can share the bus and maintain proper synchronization in the use of the bus in the presence of noise and other errors.

Figure 2:
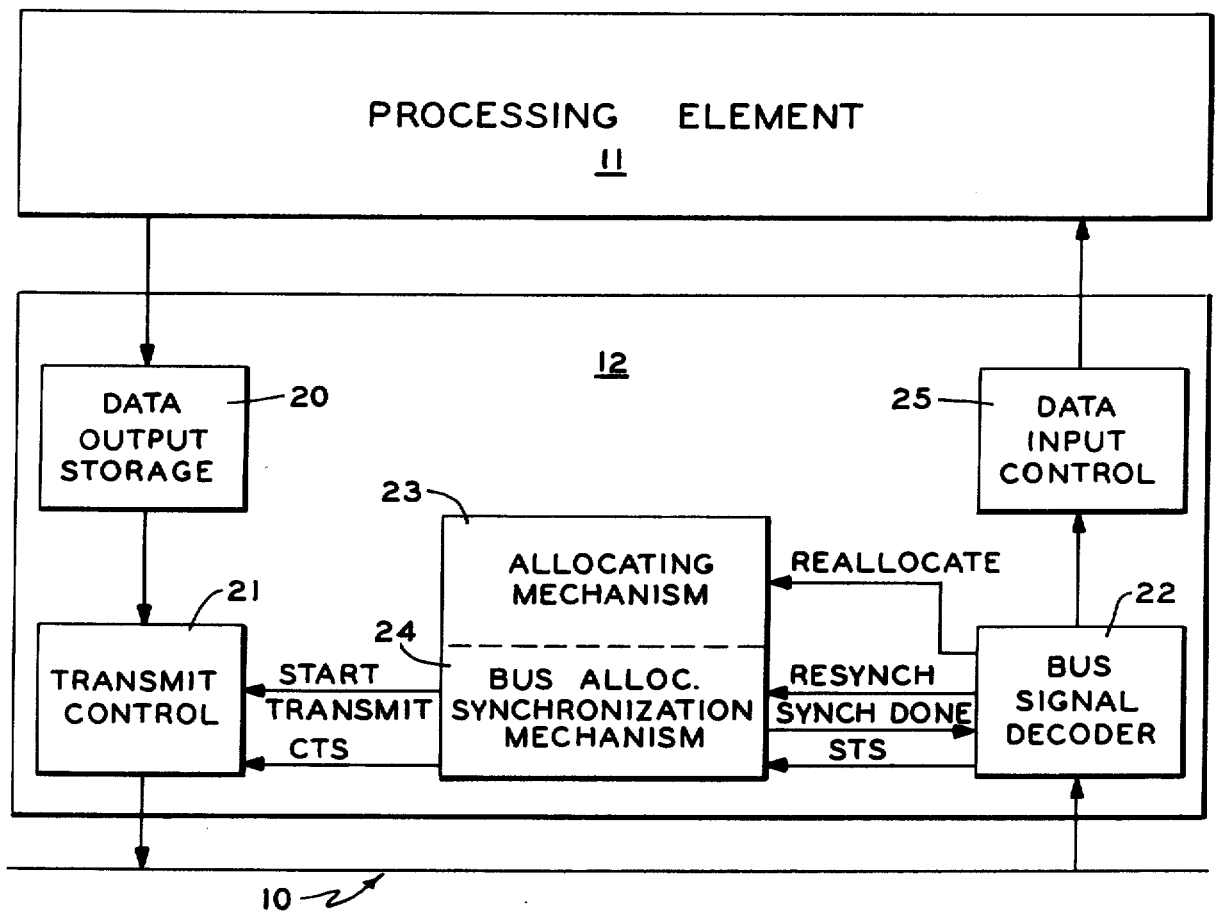
FIG. 2 is a block diagram of a bus interface unit of FIG. 2 incorporating the invention.

FIG. 2 depicts a processing element and associated bus interface unit, of FIG. 1 with the internal workings of the bus interface unit shown in block diagram form. Thus, a data output storage unit 20 is provided in the bus interface unit 12 wherein the processing element 11 (directly or indirectly) places data to be sent to another processing element. This is done through the data output transmit control 21. A bus signal decoder 22 is provided which reads in all transmissions from the bus, decodes them and passes signals to the remainder of the bus interface unit to initiate certain actions such as reallocation of the bus through an allocating mechanism 23, resynchronization of the bus through the bus allocation synchronization mechanism 24 and ultimately controls the transmit control 21. Input data is received by the data processing element involved through a data input control 25.

The bus allocation synchronization mechanism 24 accepts inputs from the bus signal decoder 22 such as "reallocate" and "resynchronization" signals and the values of certain control variables, performs certain functions, and controls transmission of the data from the data output storage 20 to the data bus 10.

Figure 3:
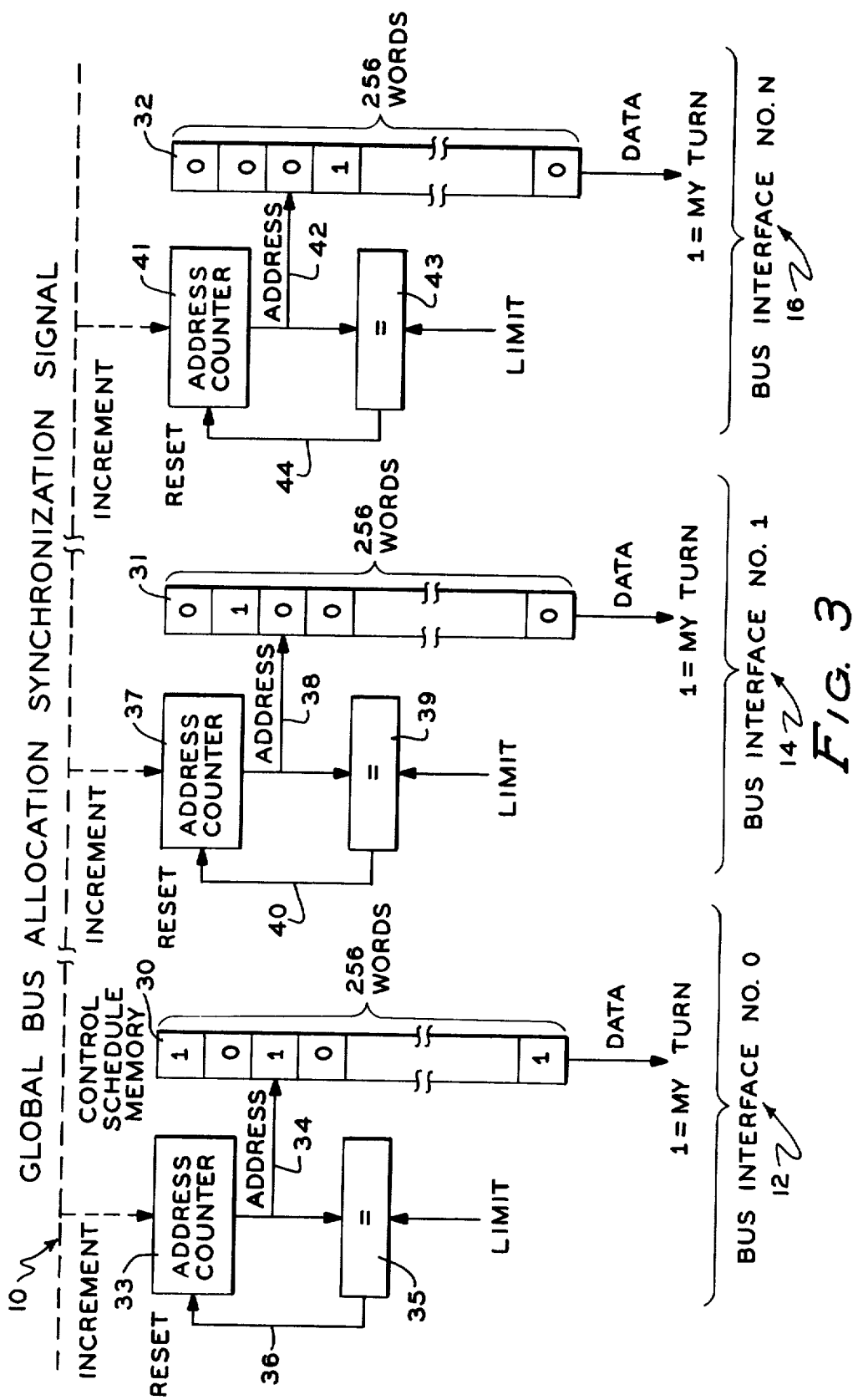
FIG. 3 is a diagram of a typical bus interface system with a bus allocation mechanism.

FIG. 3 is a schematic functional representation of a typical bus interface system of which the bus allocation synchronization system of the invention is a part. The system is represented again by three bus interfaces units 12, 14, and 16. In each bus interface unit there is an allocation vector having a plurality of distinct time slots or one-bit words represented generally by 30, 31 and 32 respectively. The distinct time slots or words of each allocation vector, in turn, contain information that defines the pattern with which that bus interface unit can use the bus 10. While the allocation vector can be of any length, for illustration purposes a length of 256 words has arbitrarily been chosen. Associated with the allocation vector 30 is an address counter 33, address pointer 34, address counter limit 35 and a reset path 36; likewise for allocation vector 31, like components are designated by numbers 37-40, respectively, and for allocation vector 32, by numerals 41-44. In each bus interface unit the allocation vector contains the information that defines the pattern with which that particular bus interface unit will have transmit access to the use of the bus. Each allocation vector has a unique control schedule consisting of "ones" and "zeros" such that one of the "n" bus interface units only one such unit will display a "1" for any common given address in the allocation vector. In the illustration of FIG. 3, only allocation vector 31 displays the logic "1" at the illustrated position of the address pointers.

Under normal circumstances, the system operates in a logical, sequential manner. Upon receipt of a "reallocation" signal from the bus 10, each bus interface unit increments its allocation vector address counter by one count; i.e., advances one time slot. The control logic then examines its particular allocation vector at the address indicated by that address counter and determines whether the bit at that address is a "1" or a "0". If that bit is a "0" then some other bus interface unit has the opportunity to transmit on the bus and this bus interface unit should not transmit during this time slot. If the bit is a "1", then the particular bus interface unit has the opportunity for control of the bus for the current time slot and can either transmit one message or data value or, if it has no message to transmit it can immediately send a bus "reallocation" signal out again which will cause the bus to immediately be reallocated to another, possibly the same, bus interface unit depending upon the contents of the several allocation vectors.

Thus, under normal operating conditions, the copy of each of the several address counters corresponding to each of the several bus interface units will be identical at all times. However, under certain noise or other error conditions and circumstances, it is possible for one or more of these address counters to miss a "reallocation" signal or for other reasons become out of synchronization with the others resulting in collisions. This is the basic problem which is solved by the bus allocation synchronization mechanism of the present invention.

Figures 4, 4A:
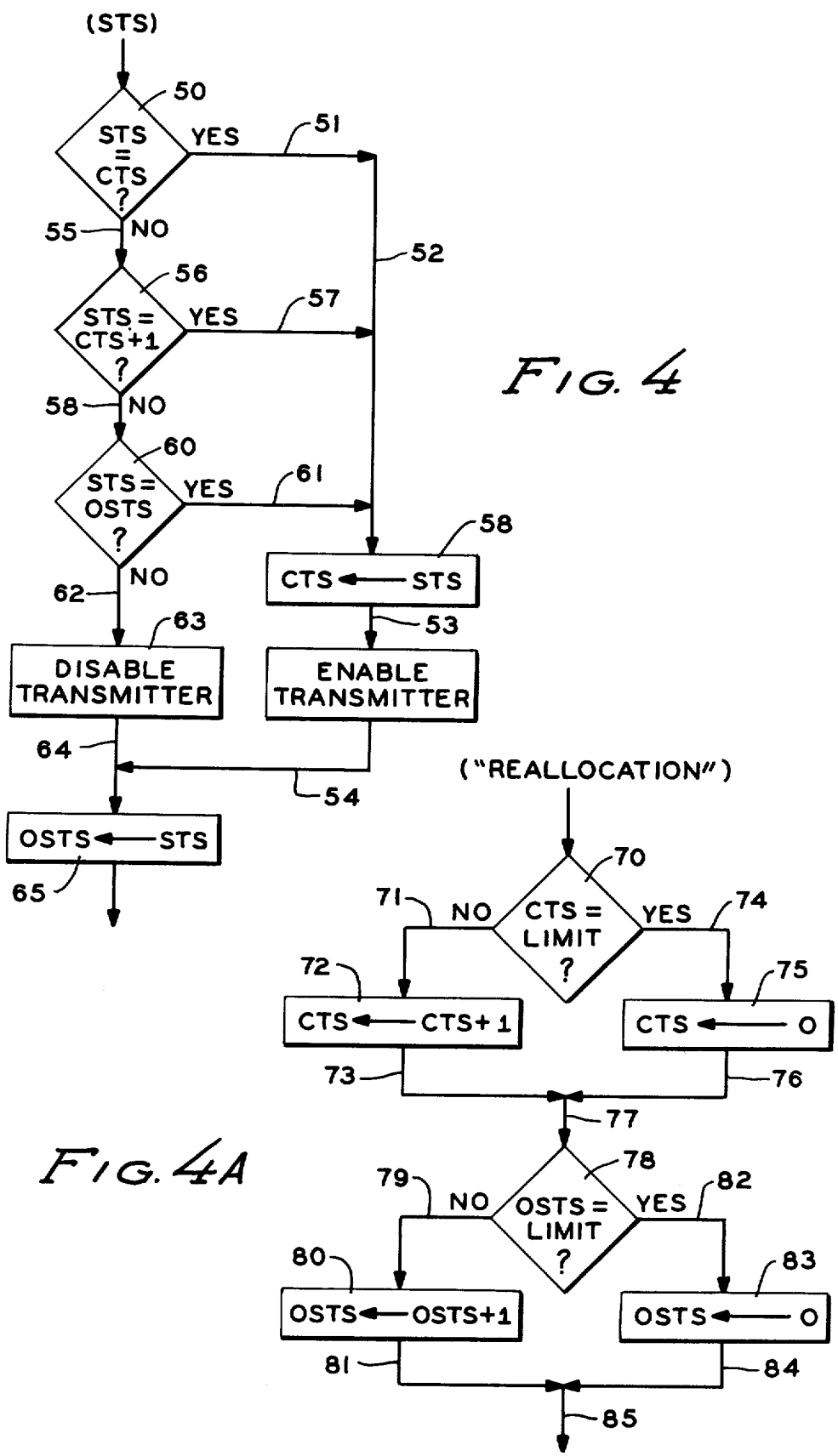
FIG. 4 is the flow chart showing the synchronization portion of the mechanism of the invention.
FIG. 4A is a flow chart of the reallocation portion of the mechanism of the invention.

In FIG. 4, there is shown a basic flow chart for the synchronization portion of the mechanism of the present invention. In order to better understand the flow chart, it is necessary to define the values of certain criteria used for the synchronization. The first of these is the current time slot (CTS) which is defined as the current internal time slot value in each bus interface unit. This is the same as the value in each address counter designated also by the address pointer in each case. The source time slot (STS) is a copy of the value of the current time slot for the user of the bus during any given bus use. This is the same as the value of the address counter or the current time slot of that sender. As part of each message sent over the bus the value of the source time slot is also sent and received by each of the several bus interface units. The old source time slot (OSTS) is normally the value of the last source time slot received by a bus interface unit and is stored in the memory of that unit. However, each time a reallocation signal is received from the bus this value is incremented by one so that the value of OSTS is consistent with the number of reallocation signals received. It should be noted from this that if every signal including reallocation signals contain a source time slot signal then the old source time slot will automatically equal the value of the source time slot in last message. It is, however, possible to construct such a system wherein allocation signals themselves do not contain the value of the source time slot.

The flow chart of FIG. 4 describes the sequence of actions which takes place when a bus interface unit receives a copy of the source time slot from any sender as part of the current message or data value transmitted on the bus. The value of the source time slot is compared at 50 with that of the current time slot contained in the address counter of the particular receiving bus interface unit. If the values are the same, then the bus interface unit is properly in synchronization and the bus interface unit transmitter will remain enabled via paths 51, 52, 53 and 54.

If the value of the source time slot was not equal to the current time slot in that particular receiving bus interface unit, the signal will exit via path 55 where at 56 the source time slot value will be compared to that of the current time slot of the receiving bus interface unit plus 1. If these values match, then the signal exits via path 57 and 52. At this point this receiving bus interface unit is one time slot behind the transmitting bus interface unit so it is assumed that the receiving bus interface unit has missed some previous reallocation signal due to interference or other error. The correction is made at 58 by setting the current time slot of the receiving bus interface unit equal to the source time slot of the transmitting bus interface unit and re-enabling the transmitter through paths 53 and 54.

If the source time slot of the transmitting bus interface unit does not equal the current time slot of the receiving bus interface unit incremented by 1, the signal exits on path 59 to 60 where the value of the source time slot of the transmitting bus interface unit is then compared with the old source time slot of the receiving bus interface unit. If these values match, then the source time slot is consistent with the last source time slot value received by the receiving bus interface unit in some previous message and the signal exists via path 61. Again, as in the previous case, the value of the current time slot of the receiving bus interface unit is assumed to be in error and, at 58, the current time slot value with a receiving bus interface unit is forced to equal the source time slot of the transmitting bus interface unit. After this takes place the transmitter of the receiving bus interface unit is again enabled through paths 53 and 54.

These corrections are sufficient to correct many minor variations which can occur in the operation of the system. If, however, the source time slot does not equal the old source time slot, the signal exists on path 62. The receiving bus interface unit recognizes that there is some time slot synchronization error but it does not have sufficient information to correct the problem. Therefore, to prevent possible dual use of the bus at some future time slot, the transmitter of the particular receiving bus interface unit is disabled temporarily at 63. That signal then exits at path 64.

If either the paths 54 or 64 is taken, the value of the source time slot of the transmitting bus interface unit is copied into the old source time slot register of each bus interface unit at 65 to provide allocation history data for furture reference. Thus, even though a particular bus interface unit may have disabled its transmitter, it will still have a copy of the current source time slot in its old source time slot register 65. It should also be noted that this value will be incremented by every reallocation signal received in the interim before the next source time slot signal is received as is discussed in greater detail below in conjunction with FIG. 4A. Therefore, the next time a source time slot is received, although neither the current time slot nor the current time slot plus 1 will match that source time slot, the source time slot will match the old source time slot at 60 and the transmitter will then be re-enabled via paths 61, 53 and 54, thereby reestablishing proper synchronization of this particular bus interface unit with the rest of the system.

FIG. 4A represents a schematic block diagram of the reallocation mechanism. When the reallocation signal which is normally given at the end of every transmission is received, the value of the current time slot is compared to the limiting value of the control schedule memory at 70. This is done with a limit register as at 35 (FIG. 3) which contains the maximum allowable control schedule memory address. If these values did not match, then path 71 is taken, the current time slot is incremented by one at 72 and path 73 is subsequently taken. If the current time slot does match the limit value, then exit path 74 is taken and the current time slot is reset to zero at 75. The exit path 76 is then taken by the signal. Both paths 73 and 76 lead to common path 77 which leads to 78 where the old source time slot is also compared with limit value of the control schedule memory. The result of this comparison either leads the signal along path 79 to 80 where the old source time slot is incremented by one then to exit path 81 or if the old source time slot does equal the limit value along path 82 to 83 wherein the old source time slot is reset to zero and the signal exits at path 84, to common 85. This command is normally invoked simultaneously by all commonly connected bus interface units.

Figure 5:
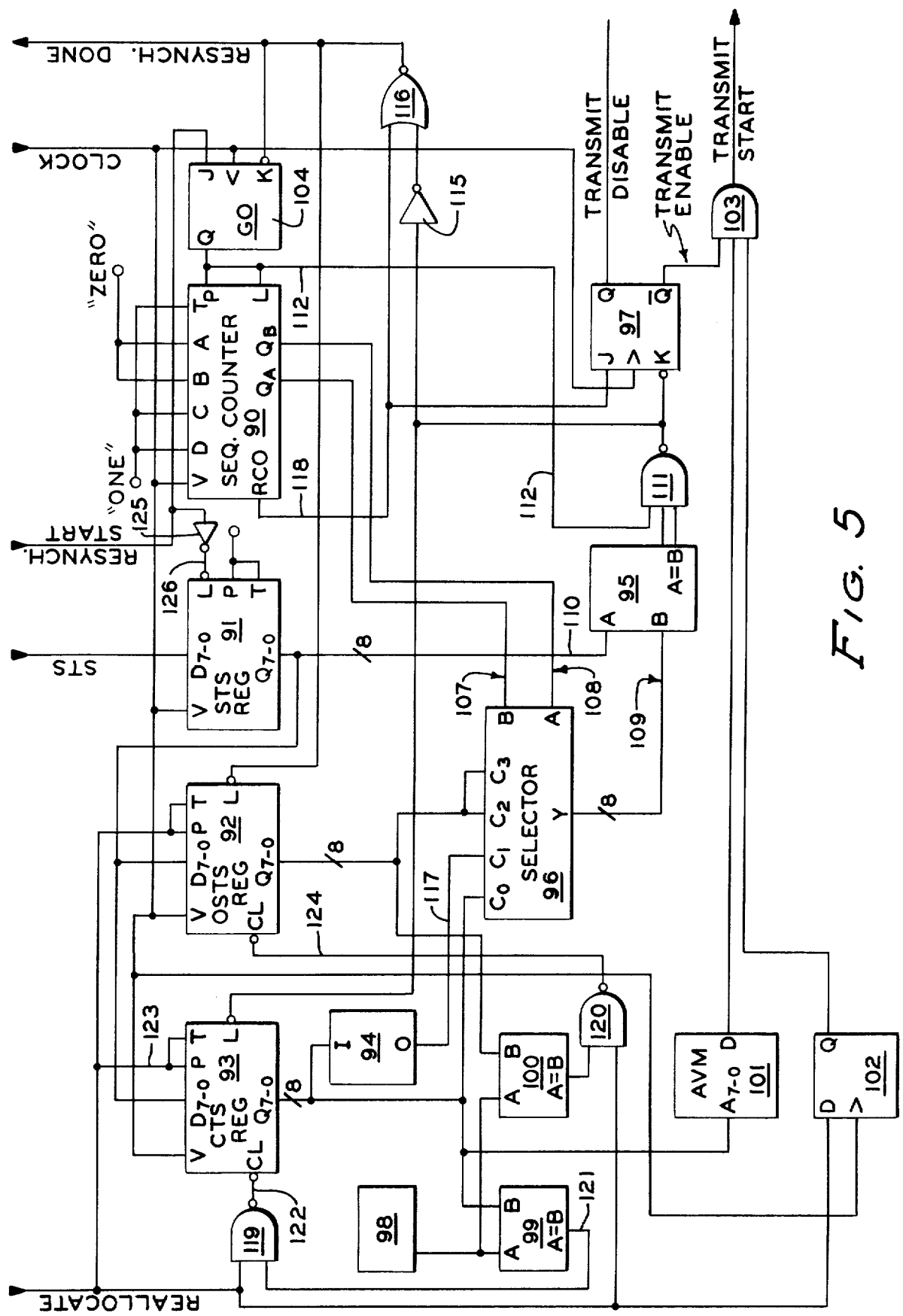
FIG. 5 is a circuit diagram of the bus allocation synchronization mechanism of FIG. 4 and 4A.

FIG. 5 is a schematic wiring diagram of the bus allocation synchronization mechanism of the invention in accordance with the flow diagrams of FIGS. 4 and 4A. One such unit is provided as a part of each bus interface unit. The primary components include a sequence counter 90 which sequences through the series of comparisons, a register 91 which is utilized to store the source time slot value, a register 92 which is utilized to store the old source time slot value, a register 93 utilized to store the current time slot value. An incrementor is provided at 94 which is utilized to supply the value of the current time slot plus one, a comparator 95 which is utilized to compare the value of the source time slot with the other values. A selector 96 which is controlled by the sequence counter 90 and selects either the current time slot, current time slot plus one or old source time slot to be compared with the source time slot is also provided. A flip-flop 97 is utilized to hold the transmit disable flag.

The primary components of FIG. 5 which are utilized to implement the reallocation portion of the flow chart in FIG. 4A include the current time slot register 93, a limit register 98 which is utilized to store the limit value of the control schedule memory and two comparators 99 and 100 which are utilized to compare the value of the current time slot and the value of the old source time slot with the value of the limit register 98. In addition, there is also an allocation vector memory 101 which is illustrated as the 256 word by one bit memory in FIG. 3. The 256-word by one bit memory corresponds to the 256 time slots. A flip-flop 102 is utilized to delay the reallocation signal by one count for using the transmit start command and a gate 104 enables the transmit start. Certain other components of both the synchronization and reallocation mechanism will also be described in conjunction with the description of the operation of the circuitry which follows.

The mechanism for the synchronization part of the system operates basically as follows. A "go" flip-flip 104 is connected such that it is normally turned off i.e., "go" is in the low position. In this mode, the sequence counter 90 is continually loaded with the binary number pattern 1100. Periodically, the bus signal decoder will start the resynchronization procedure. It accomplishes this by holding the source time slot value received from the last message on the source time slot input line going to the STS register 91 and then raising the resynchronization start signal which causes the "go" flip-flop 114 and the source time slot register 91 to be loaded through the action of inverter 125 on line 126. As can be seen on the timing diagrams of FIGS. 6 and 7, both of these events occur at sequential clock edges as shown by 105 and 106. During the period following that clock edge, it should be noted that the two sequence counter outputs $Q_B$ and $Q_A$ are 00. These, in turn, are connected to the control inputs B and A of the selector 96 through conductors 107 and 108, respectively. The control input 00 selects the contents of the current time slot register 93 to be gated into the output Y of the selector 96 which, in turn, connects it to the input B of the comparator 95 via 109. It should also be noted that the source time slot register 91 also provides the other input to the comparator at A through conductor 110. The output of the comparator 95 labeled A=B goes to one input of a two-input NAND gate 111 whose other input is the output of the "go" flip-flop 104 through conductor 112. Now if the value of the source time slot register 91 equals the value of the current time slot register 93 then the output of the NAND gate 111 will be low which will cause the transmit disable flip-flop 97 to turn off on the following clock edge 113. This, of course, means that the transmitter is enabled. It also may be noted from FIG. 6 that if the transmit disable flip-flop 97 is turned off at 113 the "go" flip-flop will also be simultaneously turned off at 114 because the output of the NAND gate 111 which, in turn, causes the transmit disable flip-flop 97 to go off is gated through an inverter 115 and a NOR gate 116 to turn off the "go" flip-flop 104. The net effect of this is to halt the sequence of comparisons and a signal "resynch done" will be returned to the bus signal decoder 22 (FIG. 2).

If the current time slot does not match the source time slot, then at the next leading clock edge the sequence counter 90 will increment by "1" giving a value of 01 on the selector 96 through the control inputs B and A. This event will select current time slot plus one in the output of the incrementor 94 which becomes the entry into the selector through 117. The output of the selector 96 will then be again applied to the comparator 95 and, if there is a match, in this case the transmit disable flip-flop 97 again will be turned off and the "go"

flip-flop turned off on the following clock edge in the same manner as in the case described above.

If the current time slot plus one does not match the source time slot, the sequence counter will again be incremented and the source time slot will be compared to the old source time slot of 92 in a similar manner. It can be appreciated that if the source time slot value does not match that of the old source time slot then on the following clock cycle the sequence counter 90 will then have the value 1111 on the output which, in turn, will cause the ripple carry output 118 of the sequence counter 90 to go high. The ripple carry output signal will be gated through the NOR gate 116 to turn off the "go" flip-flop 104 on the following cycle. It should be noted that this will also cause the transmit disable flip-flop 97 to be turned on at that same clock edge 111 (FIG. 7), thus disabling the bus interface unit from transmitting during the next reallocation cycle until synchronization is re-established.

The reallocation portion of the mechanism is found primarily on the left hand side of FIG. 5 and includes current time slot register 93, NAND gate 119, limit register 98, comparator 99, allocation vector memory 101, flip-flop 102, transmit start enable gate 103, comparator 100 and NAND gate 124. In operation, when the bus signal decoder sends a "reallocate" signal, the reallocate subsystem shown in the flow chart of FIG. 4A will then be executed in the electrical system. The two decisions at 70 and 78 is shown in FIG. 4A will be executed simultaneously. The two comparators 99 and 100 allow both the current time slot register 93 and the old source time slot register 92 to be simultaneously compared against the value of the source time slot limit register 98.

The net effect of the reallocation signal is to cause each of these registers to be incremented by one or to be reset to zero. The decision as to which of these events take place is based on the output of each of the comparators. For example, for the current time slot register 93, if the output of the comparator 99 is high (indicating a match), a logic 1 will be gated at A=B through conductor 121 through the NAND gate 119 and via 122 into the clear input of the current time slot register 93. Inasmuch as the clear input overrides the increment input, the register 93 will then be cleared and reset to zero. If, however, the output of the comparator is low indicating a mis-match, then the output of the NAND gate 119 will be high, and the register 93 will not be cleared. Since the allocation signal is connected directly through 123 to the P and T inputs of the CTS register 93 (increment enable lines) the current time slot register will be incremented. It should be noted that if the clear is asserted low and the P and T inputs are inserted high, the clear is overriding so that the clear will take place if both a clear and increment are called for by the several inputs. The old source time slot register 92 is reset or incremented in a manner similar to that of the current time slot register using the comparator 101 in conjunction with the NAND gate 120, the clear signal being received through conductor 124. This achieves the increment and reset functions called for in the diagram of FIG. 4A.

Figure 6:
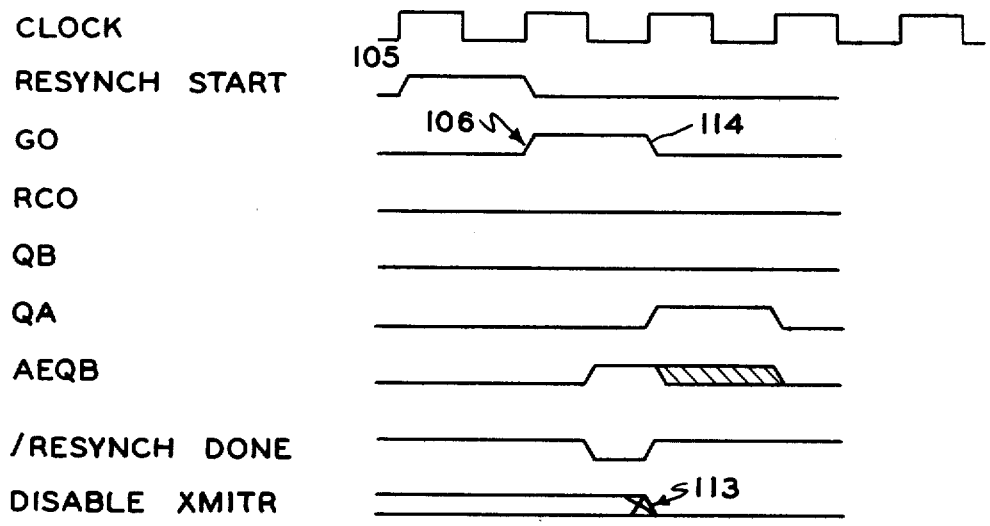
FIGS. 6 and 7 are timing diagrams representing certain conditions of the circuit of FIG. 5.
Figure 7:
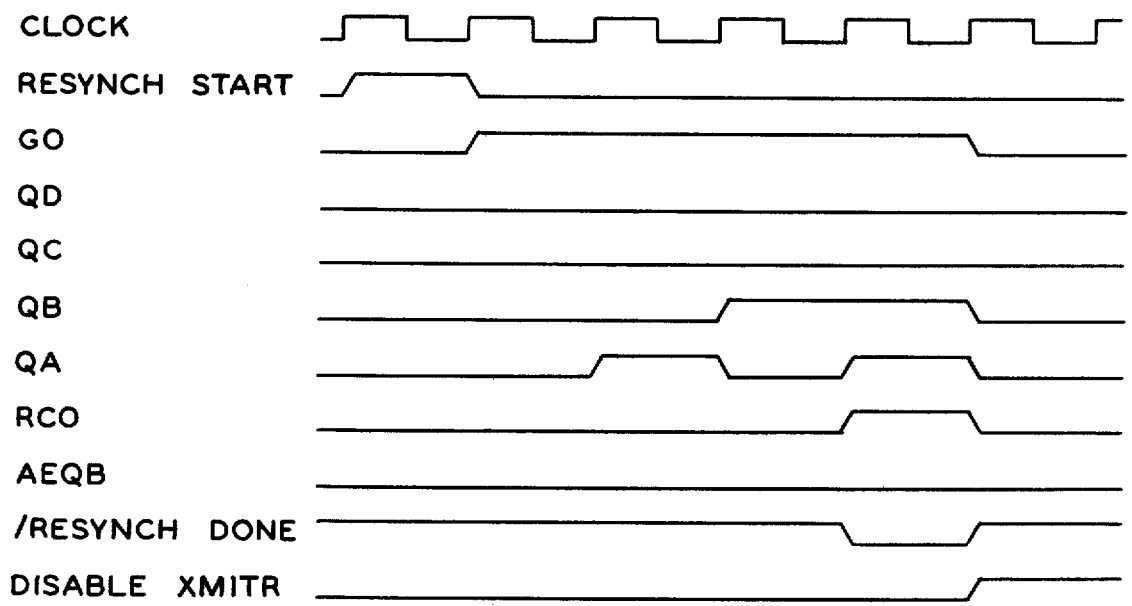

FIG. 6 and 7 which have been alluded to in our discussion of the circuitry in connection with FIG. 5, show example timing diagrams for the implementation of FIG. 5. In FIG. 6, the timing diagram represents the condition wherein the source time slot matches the current time slot and this would take place on a count of 00 on the B and A outputs of the sequence counter 90. This, of course, represents the condition wherein the particular bus interface unit is in complete synchronization with the system.

FIG. 7 shows a sample timing diagram wherein the source time slot matches none of the compared values causing the disabled transmitter flip-flop to be reset disabling the transmitter. This represents a condition wherein the particular bus interface unit is out of synchronization with the remainder of the system.

The components utilized in the diagram of FIG. 5 in one embodiment were standard off-the-shelf items and are listed as follows:

| | |
|---|---|
| Sequence Counter 90 | 74LS163A |
| STS Register 91 | 2-74LS163A |
| OSTS Register 92 | 2-74LS163A |
| CTS Register 93 | 2-74LS163A |
| Incrementor 94 | 2-74LS283 |
| Comparator 95 | 3-74LS85 |
| Selector 96 | 4-74LS153 |
| Flip-flop 97 | 74LS109A |
| Limit Register 98 | 2-74LS163A |
| Comparator 99 | 3-74LS85 |
| Comparator 101 | 3-74LS85 |
| Allocation Vector Memory 101 | 74LS200A |
| Flip-flop 102 | 74LS74 |
| Tranmit Start Enable Gate 103 | 74LS11 |
| "Go" Flip-flop 104 | 74LS109A |
| Two Input NAND Gate 111 | 74LS00 |
| Inverter 115 and 125 | 74LS04 |
| NOR gate 116 | 74LS02 |
| NAND gate 119 & 120 | 74LS00 |

All of the above-mentioned electronic parts are readily available from several supply sources such as Texas Instruments of Dallas, Tex. In conjunction with the use of all the enumerated parts shown in the diagram of the preferred embodiment in FIG. 5 are described as to application in greater detail in books entitled, *The TTL Data Book for Design Engineers*, 2nd ed. (1976), also published by Texas Instruments.

From the above, it can readily be seen that the bus allocation synchronization system of the present invention provides an effective, simple and relative interference-proof, system for maintaining synchronization in the use of a common bus by a plurality of digital devices. Although the incremental steps shown in sequencing the allocation system of the invention and the allocation synchronization system of the invention are illustrated at unitary increments, it will be readily appreciated that any sequence of counts including a multiplicity of counts in one increment can be utilized so long as all bus interface units are coordinated in this respect.

The embodiments of the invention in which an exclusive property or right is claimed are defined as follows:

1. A decentralized bus allocation synchronization system for a plurality of inter-communicating processing devices which share a common data bus in a time multiplexed fashion wherein no single entity controls access to the bus or synchronization of access to the bus comprising:
 a plurality of processing devices adapted to communicate along a common bus;
 a bus interface unit associated with each of said processing devices for controlling the access of that device to said bus, each said bus interface unit further comprising
 transmitting means for transmitting signals over said bus;

receiving means for receiving signals from said bus;
enabling means for enabling access to said bus, said enabling means further comprising:
  allocation vector means for storing a predetermined control schedule sequence of instructions related to the use of the bus;
  recyclable indexing interface means for indexably addressing said sequence of instructions wherein said indexing is responsive to a command received from said bus;
  synchronization checking means for utilizing allocation and synchronization information from previously received communications and the current communication received by said receiving means, and from said indexing interface means to determine the synchronization state of said enabling means;
  disabling means for disabling said transmitting means if said synchronization checking means fails to determine synchronization state;
  synchronization re-establishing means for re-enabling said transmitter by re-establishing synchronization of said indexing interface means.

2. The bus allocation synchronization system of claim 1 wherein said information utilized by said synchronization checking means received as part of a previous communication includes the value of the old source time slot; and wherein said information received as part of the current communication includes the value of the source time slot; and wherein said information received from said indexing interface means is the value of the current time slot.

3. The bus allocation synchronization system of claim 2 wherein said synchronization checking means further comprises:
  storage means for storing the value of a source time slot received as part of the current communication from said bus, the current time slot of said indexing interface means and the old source time slot from a previous communication on said bus;
  means for comparing the value of the source time slot received with each message with the value of said current time slot, said current time slot plus one and said old source time slot;
  means for modifying the value of the current time slot such that when an equality is found for any of said comparisons made by said means for comparing, the value of said current time slot is made to equal said source time slot.

4. The bus allocation system of claim 3 wherein said synchronization re-establishing means further comprises:
  means for modifying the value of said old source time slot such that it equals said source time slot received with a message;
  means for incrementing the address of said indexing interface means, the value of said current time slot and the value of said old source time slot on reallocation command; and
  means for recycling said storage means.

5. A bus allocation synchronization system for use wherein a plurality of inter-communicating processing devices share a common data bus in a time-multiplexed fashion and wherein no single entity controls access to use the bus or synchronization for access to use the bus, said access and synchronization being independently determined by a bus interface unit associated with each of said devices, each of said bus interface units comprising:
  transmitting means for transmitting signals over said bus;
  receiving means for receiving signals from said bus;
  allocation vector means for storing a predetermined control schedule sequence of instructions related to the use of the bus;
  recyclable indexing interface means for indexably addressing said sequence of instructions wherein said indexing is responsive to a reallocation command received from said bus;
  storage means for storing the value of a source time slot received by said receiving means as part of the current communication from said bus, the current time slot as indicated by said indexing interface means and the old source time slot from a previous communication on said bus received by said received means;
  means for comparing the value of the source time slot received with each message with the value of said current time slot, said current time slot plus one and said old source time slot;
  means connected to said indexing interface means and said storge means for modifying the value of the current time slot such that when an equality is found for any of said comparisons made by said means for comparing, the value of said current time slot is made to equal said source time slot;
  means for disabling said transmitting means when none of the said comparisons are equal;
  means connected to said storage means for modifying the value of said old source time slot such that it equals said source time slot received with a message;
  means for incrementing the address of said indexing interface means, the value of said current time slot and the value of said old source time slot on reallocation command; and
  means responsive to the values of said time slots for selectively recycling said indexing interface means and the contents of said storage means.

* * * * *